United States Patent
Zhao

(10) Patent No.: US 11,920,633 B2
(45) Date of Patent: Mar. 5, 2024

(54) TELESCOPIC ROD STRUCTURE

(71) Applicant: Lihong Zhao, Weihai (CN)

(72) Inventor: Lihong Zhao, Weihai (CN)

( * ) Notice: Subject to any disclaimer, the term of this patent is extended or adjusted under 35 U.S.C. 154(b) by 0 days.

(21) Appl. No.: 18/098,195

(22) Filed: Jan. 18, 2023

(65) Prior Publication Data

US 2023/0235777 A1  Jul. 27, 2023

(30) Foreign Application Priority Data

Jan. 24, 2022 (CN) .......................... 202220192606.X

(51) Int. Cl.
*B25G 1/04* (2006.01)
*F16C 3/03* (2006.01)

(52) U.S. Cl.
CPC .................. *F16C 3/03* (2013.01); *B25G 1/04* (2013.01); *Y10T 403/32467* (2015.01); *Y10T 403/7077* (2015.01)

(58) Field of Classification Search
CPC . F16C 3/03; B25G 1/04; Y10T 16/473; Y10T 403/32467; Y10T 403/7073; Y10T 403/7077
USPC .......................................... 403/377; 285/302
See application file for complete search history.

(56) References Cited

U.S. PATENT DOCUMENTS

| | | | | |
|---|---|---|---|---|
| 1,095,926 A | * | 5/1914 | Powell | F15B 15/16 285/302 |
| 2,756,022 A | * | 7/1956 | Sturgeon | E21B 17/07 285/302 |
| 3,577,746 A | * | 5/1971 | Dolan | F16D 3/06 464/162 |

FOREIGN PATENT DOCUMENTS

DE             450 773   * 10/1927 .................... 403/375

OTHER PUBLICATIONS

Universal Joint and Driveshaft Design Manual, AE-7, Society of Automotive Engineers, Inc., Warrendale, PA, Chapter 5, pp. 185-198. TJ1079.S62. (Year: 1979).*

* cited by examiner

*Primary Examiner* — Greg Binda
(74) *Attorney, Agent, or Firm* — Daniel M. Cohn; Howard M. Cohn

(57) ABSTRACT

A telescopic rod structure includes an upper rod and a lower rod. The upper rod includes a first rod body and a second rod body. A diameter of the first rod body is less than a diameter of the second rod body. A rod stepped surface is formed between the first rod body and the second rod body. An outer wall of the second rod body defines a guide groove. The lower rod defines a first through hole and a second through hole. A diameter of the first through hole is less than a diameter of the second through hole. A hole stepped surface is formed between the first through hole and the second through hole. A rib is arranged on the second through hole. The second rod body is sleeved in the second through hole. The first rod body upwards passes through the first through hole.

7 Claims, 7 Drawing Sheets

TELESCOPIC ROD STRUCTURE

TECHNICAL FIELD

The present disclosure relates to a technical field of telescopic tubing, and in particular to a telescopic rod structure.

BACKGROUND

As we all know, a conventional telescopic rod that is extendable or shrinkable generally comprises a plurality of rods connected in sequence. The conventional telescopic rod is widely used in many fields, e.g., the conventional telescopic rod is applied in cleaning sanitary wares, outdoor sporting goods, support goods on ships, audio-visual and photographic equipment, inspection and testing equipment, etc. The conventional telescopic rod generally comprises two adjacent telescopic tubes and the two adjacent telescopic tubes are connected to each other by an elastic piece arranged in a gap between the two adjacent telescopic tubes. Since each telescopic tube is of a cylindrical tubular structure, diameters of two ends of each telescopic tube is same.

An inner diameter of a first telescopic tube of the two adjacent telescopic tubes is matched with an outer diameter of a second telescopic tube of the two adjacent telescopic tubes, so that the second telescopic tube is insertable into the first telescopic tube. In a use process, the conventional telescopic rod has three main problems as follows.

First, when in use, it is not easy to fix a direction of each telescopic tube when each telescopic tube is extended or retracted. Especially, each telescopic tube is easy to arbitrarily rotate in a range of 360 degrees, so it takes a long time to do a directional alignment of each telescopic tube. Further, since the direction of each telescopic tube is not easy to control, accidents are easily occur, such as collision with other objects or failure to quickly put in place.

Second, when in use, the first telescopic tube is easily withdrawn from the second telescopic tube.

Finally, there are many parts inside the conventional telescopic rod, which occupy space and affect an extending length of the conventional telescopic rod.

SUMMARY

A purpose of the present disclosure is to provide a telescopic rod structure with a streamlined, stable, and reliable structure to solve deficiencies in the prior art.

The present disclosure provides the telescopic rod structure. The telescopic rod structure comprises at least two rods sequentially and telescopically connected in a vertical direction. The at least two rods are tubular. A first rod of each two adjacent rods of the at least two rods having a smaller outer diameter is defined as an upper rod. A second rod of each two adjacent rods having a larger outer diameter is defined as a lower rod.

The upper rod is of a stepped rod-shaped structure. The upper rod comprises a first rod body and a second rod body connected with the first rod body. The first rod body and the second rod body are arranged from top to bottom along the vertical direction. A diameter of the first rod body is less than a diameter of the second rod body. A rod stepped surface is formed between the first rod body and the second rod body. The rod stepped surface is annular. An outer wall of the second rod body defines a guide groove, and an extending direction of the guide groove is same as an axial direction of the second rod body. The lower rod defines an inner hole.

The inner hole is a stepped hole. The stepped hole comprises a first through hole and a second through hole communicated with the first through hole. The first through hole and the second through hole are arranged from top to bottom. A diameter of the first through hole is less than a diameter of the second through hole. A hole stepped surface is formed between the first through hole and the second through hole. The hole stepped surface is annular. A rib matched with the guide groove is arranged on an inner wall of the second through hole. The rib is slidably connected with the guide groove in the extending direction of the guide groove. The second rod body is sleeved in the second through hole. The first rod body upwards passes through the first through hole. The diameter of the first through hole is less than the rod stepped surface.

Optionally, the first rod body and the second rod body are of an integral structure. A central axis of the first rod body overlaps with a central axis of the second rod body.

Optionally, a central axis of the first through hole overlaps with a central axis of the second through hole.

Optionally, the first through hole is in clearance fit with the first rod body.

Optionally, a ratio of a length of the second rod body to a length of the first through hole is 3:1.

Optionally, a sum of the length of the second rod body $L_1$ and the length of the first through hole $L_2$ represents 5-15% of a length of the upper rod.

Optionally, a width of the hole stepped surface is $d_1$. $d_1$ satisfies $0<d_1<(D_2-D_1)<2$ mm. A width of the rod stepped surface is $d_2$. $d_2$ satisfies $(D_2-2d_1-D_1)/2<d_2<(D_2-D_1)/2$. $D_2-2d_2<D_1+2d_1$. $D_1$ represents the diameter of the first rod body and $D_2$ represents the diameter of the second through hole.

Optionally, a height of the rib is h, and $h=(D_2-D_1)/2$. A width of the rib is w, and $0<w<2\sqrt{(D_2/2)^2-(D_1/2)^2}$.

Optionally, the upper rod and the lower rod are made of one material selected from carbon fiber composite, glass fiber composite, and polymer epoxy resin composite.

Optionally, the telescopic rod structure further comprises a telescopic rod locking device arranged between the upper rod and the lower rod. The telescopic rod locking device is connected with the upper rod and the lower rod. The telescopic rod locking device is sleeved on a position of the lower rod locating at an outer wall of the first through hole.

In the present disclosure, the rib of the lower rod is matched with and slidable in the guide groove of the upper rod. When the telescopic rod structure is extended or retracted and used, the guide groove and the rib play a guiding role and allow the telescopic rod structure to slide fast, which avoids rotation of the telescopic rod structure and reduce shaking of the telescopic rod structure during use.

The diameter of the first through hole of the lower rod is less than the diameter of the rod stepped surface of the upper rod. When the upper rod is extended, the hole stepped surface limits the rod stepped surface, so that the upper rod is unable to be withdrawn from the lower rod.

The present disclosure does not add additional components, so the telescopic rod structure effectively uses a space inside the telescopic rod structure and increases an extending length of the upper rod relative to the lower rod.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure. Methods used in the present disclosure are conventional if not otherwise specified. Raw materials and devices used in the present disclosure are conventional commercially available products if not otherwise specified.

As shown in FIGS. 1-3, and 5-6, the present disclosure provides a telescopic rod structure. The telescopic rod structure comprises at least two rods sequentially and telescopically connected in a vertical direction. The at least two rods are tubular. A first rod of each two adjacent rods of the at least two rods having a smaller outer diameter is defined as an upper rod 1. A second rod of each two adjacent rods having a larger outer diameter is defined as a lower rod 2.

Figure 9:
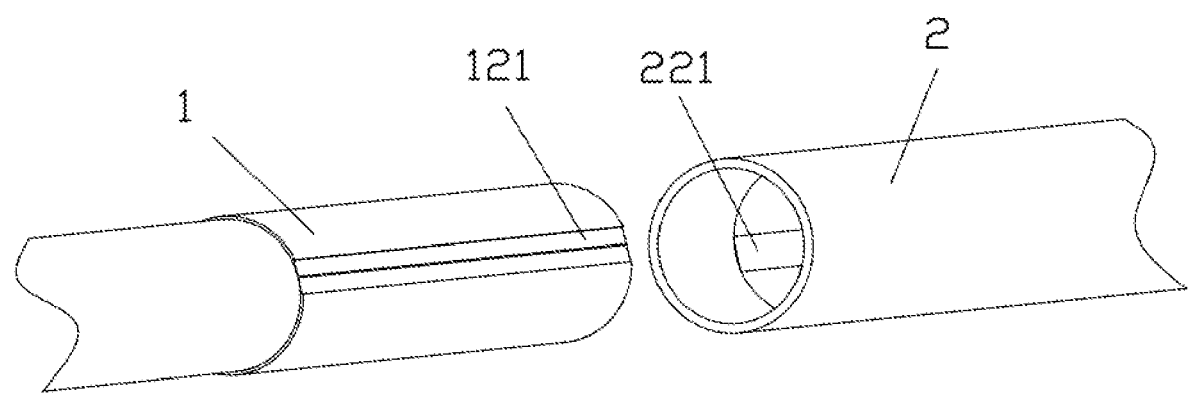
FIG. 9 is another schematic diagram of a rib with a corresponding guide groove according to one embodiment of the present disclosure.

The upper rod 1 is of a stepped rod-shaped structure. The upper rod 1 comprises a first rod body 11 and a second rod body 12 connected with the first rod body 11. The first rod body 11 and the second rod body 12 are arranged from top to bottom along the vertical direction. A diameter of the first rod body 11 is less than a diameter of the second rod body 12. A rod stepped surface 13 is formed between the first rod body 11 and the second rod body 12. The rod stepped surface 13 is annular. An outer wall of the second rod body 12 defines a guide groove 121, and an extending direction of the guide groove 121 is same as an axial direction of the second rod body 12. The lower rod 2 defines an inner hole. The inner hole is a stepped hole. The stepped hole comprises a first through hole 21 and a second through hole 22 communicated with the first through hole 21. The first through hole 21 and the second through hole 22 are arranged from top to bottom. A diameter of the first through hole 21 is less than a diameter of the second through hole 22. A hole stepped surface 23 is formed between the first through hole 21 and the second through hole 22. The hole stepped surface 23 is annular. As shown in FIG. 9, A rib 221 matched with the guide groove 121 is arranged on an inner wall of the second through hole 22. The rib 221 is slidably connected with the guide groove 121 in the extending direction of the guide groove. The second rod body 12 is sleeved in the second through hole 22. The first rod body 11 upwards passes through the first through hole 21. The diameter of the first through hole 21 is less than a diameter of the rod stepped surface 13.

In one optional embodiment, the first rod body 11 and the second rod body 12 are of an integral structure. A central axis of the first rod body 11 overlaps with a central axis of the second rod body 12, which on the one hand enhances a strength of the upper rod 1, and on the other hand does not need to cooperate with other components, thus reducing labor on assembly and preventing the other components from falling off.

In one optional embodiment, an central axis of the first through hole 21 overlaps with an central axis of the second through hole 22, which is easy to assemble and use.

In one optional embodiment, the first through hole 21 is in clearance fit with the first rod body 11, which further reduces a swing range of the upper rod 1 within the lower rod 2.

In one optional embodiment, a ratio of a length of the second rod body 12 to a length of the first through hole 21 is 3:1, which further reduces the swing range of the upper rod 1 within the lower rod 2.

Figure 2:
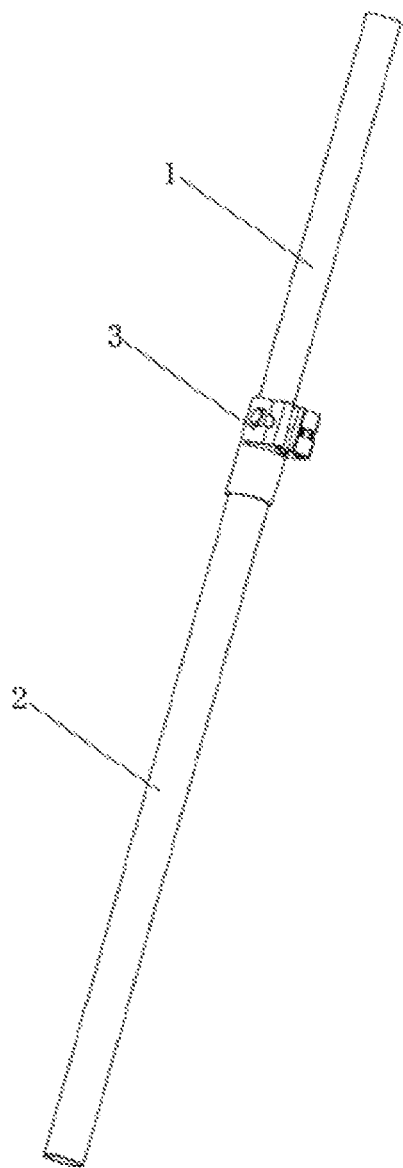
FIG. 2 is a schematic diagram of an upper rod of a telescopic rod structure according to one embodiment of the present disclosure.
Figure 3:
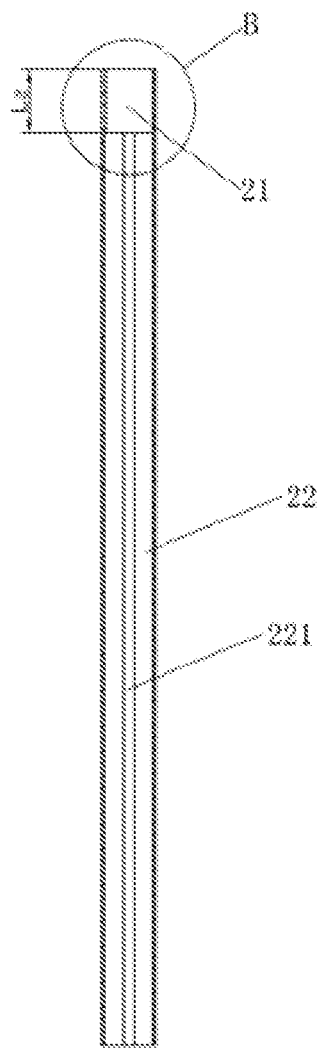
FIG. 3 is a schematic diagram of a lower rod of a telescopic rod structure according to one embodiment of the present disclosure.
Figure 4:
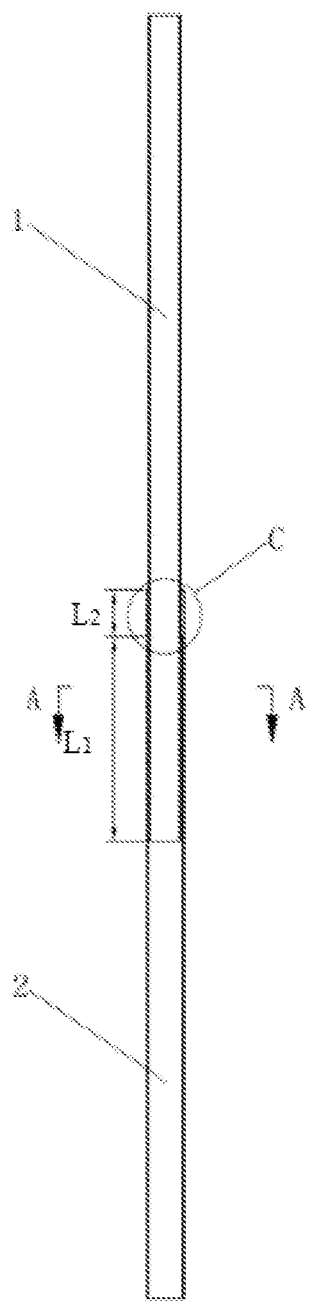
FIG. 4 is a schematic diagram of the upper rod and lower rod shown in a configuration of use according to one embodiment of the present disclosure.

In one optional embodiment, as shown in FIGS. 2-4, a sum of the length of the second rod body L1 and the length of the first through hole L2 represents 5-15% of a length of the upper rod 1. When the telescopic rod structure is fully extended, the second rod body 12 and the first through hole 21 are an overlapping portion of the upper rod 1 and the lower rod 2. When either end of the telescopic rod structure is subjected to force, if it is guaranteed that the overlapping portion is the only variable, then the more overlapping portion occupied, the better the force on the telescopic rod structure, and the less likely to break or crack. On the contrary, if it is guaranteed that the overlapping portion is the only variable, then the less the overlapping portion, the worse the force on the telescopic rod structure, and the more likely to break or crack at a joint position. According to an actual production, in order to ensure the extending length of the telescopic rod structure, a length of the overlapping portion is generally 5%-15% of the length of the upper rod. The ratio is adjusted according to an actual use of the product or customer needs.

Figure 5:
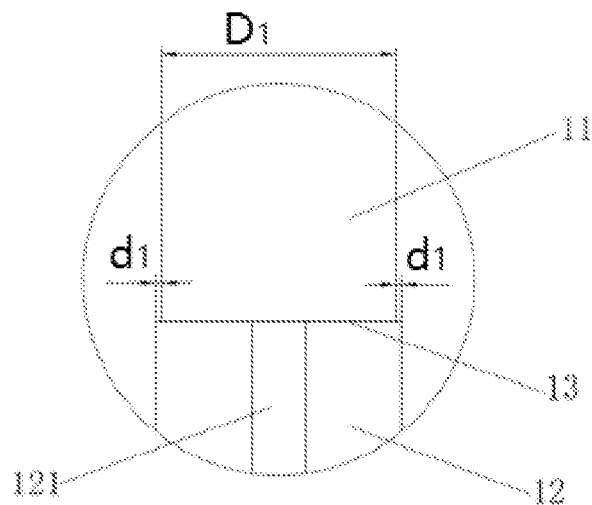
FIG. 5 is an enlarged schematic diagram of portion A shown in FIG. 2.
Figure 6:
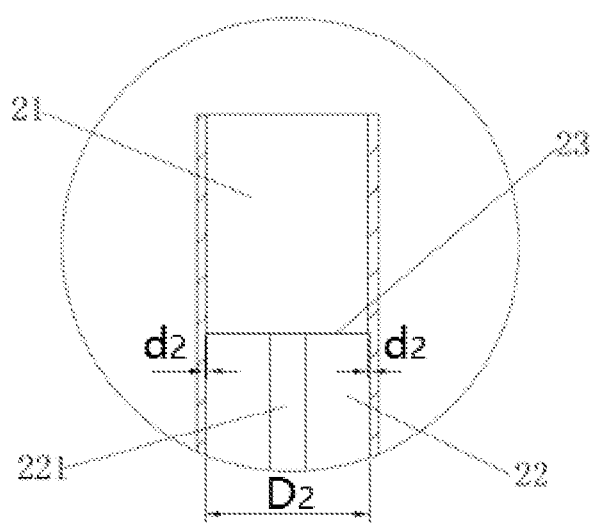
FIG. 6 is an enlarged schematic diagram of portion B shown in FIG. 3.
Figure 7:
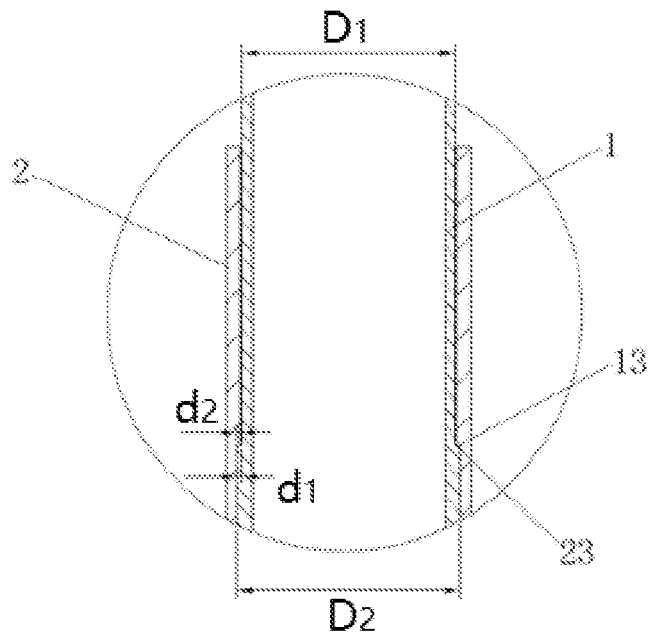
FIG. 7 is an enlarged schematic diagram of portion C shown in FIG. 4.
Figure 8:
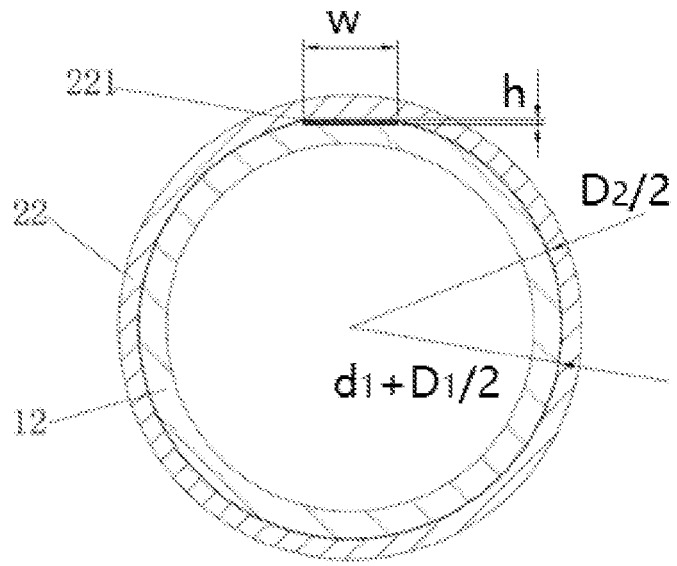
FIG. 8 is an enlarged cross-sectional schematic diagram taken along the line A-A shown in FIG. 4.

In one optional embodiment, as shown in FIGS. 5-7, a width of the hole stepped surface 23 is $d_1$. $d_1$ satisfies $0<d_1<(D_2-D_1)<2$ mm. A width of the rod stepped surface 13 is $d_2$. $d_2$ satisfies $(D_2-2d_1-D_1)/2<d_2<(D_2-D_1)/2$. $D_2-2d_2<D_1+2d_1$. $D_1$ represents the diameter of the first rod body and $D_2$ represents the diameter of the second through hole. In the actual production, taking actual production tolerances into account, the width $d_1$ of the hole stepped surface 23 and the width $d_2$ of the rod stepped surface 13 need to be corrected. However, corrected values of $d_1$ and $d_2$ must satisfy above formulas and satisfy $D_2-2d_2<D_1+2d_1$, so that the upper rod 1 cannot be pulled out from the lower rod 2 during an extending process, which avoid a situation of disconnection of the upper rod and the lower rod. The diameter of the first through hole 21 is less than the diameter of the rod stepped surface 13 to ensure that the upper rod 1 cannot be pulled out of the lower rod 2 during use, i.e., $D_2-2d_2<D_1+2d_1$.

In one optional embodiment, as shown in FIGS. 5-8, a height of the rib 221 is h, and $h=(D_2-D_1)/2$. A width of the rib is w, and $0<w<2\sqrt{(D_2/2)^2-(D_1/2)^2}$.

In the actual production, taking the actual production tolerances into account, a theoretical value of the height of the rib 221 must be corrected, the width of the rib 221 needs to be appropriately taken according to the actual use of the telescopic rod structure and production needs, and a corrected value needs to meet the requirements of the above formula. A maximum value of the width of the rib 221 is a chord length of a circle made by the inner diameter $D_2$ of the lower rod 2 corresponding to a tangent of a circle formed by the outer diameter $D_1$ of the upper rod 1. According to the Pythagorean theorem, the maximum value of w is $2\sqrt{(D_2/2)^2-(D_1/2)^2}$.

In one optional embodiment, the upper rod and the lower rod are made of one material selected from carbon fiber composite, glass fiber composite, and polymer epoxy resin composite. Therefore, the upper rod and the lower rod have advantages of light weight, small droop, high strength, wear and corrosion resistance, etc., and have a broad market development prospect.

Figure 1:
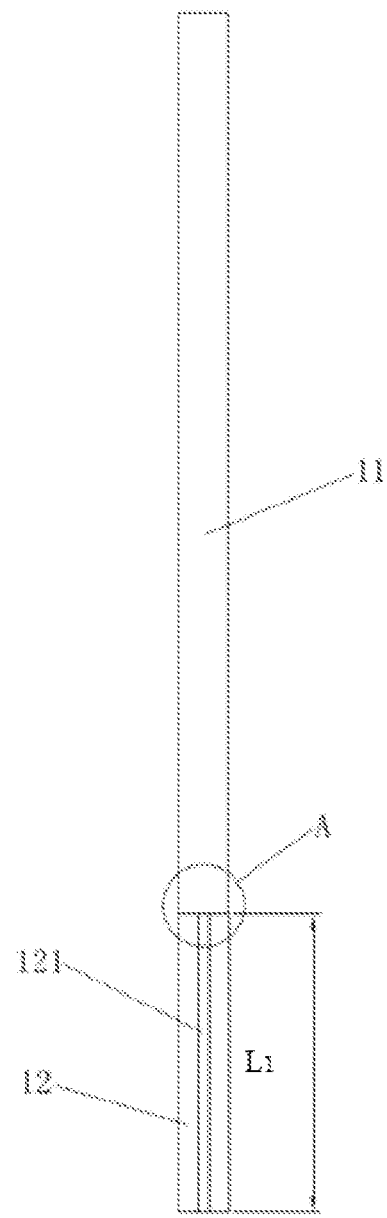
FIG. 1 is a schematic diagram of a telescopic rod structure according to one embodiment of the present disclosure.

In one optional embodiment, as shown in FIG. 1, the telescopic rod structure further comprises a telescopic rod locking device 3 arranged between the upper rod and the lower rod. The telescopic rod locking device 3 is connected with the upper rod 1 and the lower rod 2. The telescopic rod locking device 3 is sleeved on a position of the lower rod 2 locating at an outer wall of the first through hole 21. By locking a locking sleeve of the telescopic rod locking device 3, the lower rod 2 is pressed against the upper rod 1, so the lower rod 2 is fixedly connected with the upper rod 1. When the telescopic rod locking device 3 is unlocked, the lower rod 2 is slidably connected with the upper rod 1, and the upper rod 1 is extendable or retractable from the lower rod 2. The telescopic rod locking device 3 may be a telescopic rod lock catch with a compression handle, which is easy to use.

In addition, in one optional embodiment, as shown in FIG. 3, the guide groove 121 of the present disclosure runs through the second rod body 12, and a length of the guide groove 121 is equal to the length of the second rod body 12. Compared with conventional products, the length of the guide groove 121 is much longer, which ensures a normal operation of a guide function of the guide groove and preventing the first rod body from separating from the guide groove when sliding.

During installation, the first rod body 11 of the upper rod 1 is inserted into the second through hole 22 at a bottom of the lower rod 2, then the guide groove 121 of the second rod body 12 of the upper rod 1 is aligned with the rib 221 on the inner wall of the second through hole 22 and continues to be inserted inward until the upper rod 1 is completely inserted into the lower rod 2. At this time, the second rod body12 is accommodated in the second through hole 22, and the first rod body 11 passes through the first through hole 21 and extends out to complete the installation of the upper rod 1 and the lower rod 2. When the present disclosure is in use, the upper rod 1 extends or retracts relative to the lower rod 2.

In the present disclosure, the rib is axially arranged on the inner wall of the second through hole 22. When the upper rod 1 extends or retracts, the rib 221 plays a key guiding role, so that the upper rod is not swung and is quickly and effectively positioned during use. At the same time, the rib 221 also plays a role in assisting and enhancing a structure of the lower rod.

The second rod body 12 of the upper rod 1 of the present disclosure defines the guide groove 121, which plays a key guiding role when the upper rod 1 is extended or retracted.

The rib 221 of the lower rod 2 is matched with and slidable in the guide groove 121 of the upper rod 1. When the telescopic rod structure is extended, retracted, or used, the guide groove 121 and the rib 221 play a guiding role and allow the telescopic rod structure to slide fast, which avoids rotation of the telescopic rod structure and reduce shaking of the telescopic rod structure during use.

The diameter of the first through hole 21 of the lower rod is less than the diameter of the rod stepped surface 13 of the upper rod 1. When the upper rod 1 is extended, the hole stepped surface 23 limits the rod stepped surface 13, so that the upper rod 1 is unable to be withdrawn from the lower rod 2.

The telescopic rod locking device 3 of the present disclosure acts as a connection locking piece configured to lock and fix the upper rod 1 and the lower rod 2. Without changing a size, a shape, and functions of the telescopic rod locking device 3, the telescopic rod structure is able to be fixed to a desired length during extension or retraction, and the upper rod 1 cannot be pulled out of the lower rod 2 during extension. The telescopic rod locking device 3 may have different appearance patterns, different locking methods, different diameters, different lengths, and different wall thicknesses.

The upper rod 1 of the present disclosure does not need to be manually aligned with the lower rod 2 when extending and retracting. Further, the present disclosure does not add additional components, so the telescopic rod structure effectively uses a space inside the telescopic rod structure and increases an extending length of the upper rod relative to the lower rod.

It should be understood in the description of the present disclosure that terms such as "upper", "lower", "front", "rear", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

It should be noted that in the above-mentioned embodiments, the terms "first" and "second" do not represent an absolute distinction in structure and/or function, nor do they represent a sequential order of execution, but are merely for descriptive convenience.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A telescopic rod structure, comprising: at least two rods sequentially and telescopically connected in a vertical direction; the at least two rods are tubular; wherein a first rod of each two adjacent rods of the at least two rods having a smaller outer diameter is defined as an upper rod; a second rod of each two adjacent rods having a larger outer diameter is defined as a lower rod;

wherein the upper rod is of a stepped rod-shaped structure; the upper rod comprises a first rod body and a second rod body connected with the first rod body; the first rod body and the second rod body are arranged from top to bottom along the vertical direction; a diameter of the first rod body is less than a diameter of the second rod body; a rod stepped surface is formed between the first rod body and the second rod body; the rod stepped surface is annular; an outer wall of the second rod body defines a guide groove, and an extending direction of the guide groove is same as an axial direction of the second rod body;

the lower rod defines an inner hole; the inner hole is a stepped hole; the stepped hole comprises a first through hole and a second through hole communicated with the first through hole; the first through hole and the second through hole are arranged from top to bottom; a diameter of the first through hole is less than a diameter of the second through hole;

a hole stepped surface is formed between the first through hole and the second through hole; the hole stepped surface is annular; a rib matched with the guide groove is arranged on an inner wall of the second through hole; and the rib is slidably connected with the guide groove in the extending direction of the guide groove; the second rod body is sleeved in the second through hole; the first rod body upwards passes through the first through hole; the diameter of the first through hole is less than a diameter of the rod stepped surface, wherein a length of the guide groove is equal to the length of the second rod body, wherein a ratio of a length of the second rod body to a length of the first through hole is 3:1.

2. The telescopic rod structure according to claim 1, wherein the first rod body and the second rod body are of an integral structure; an central axis of the first rod body overlaps with an central axis of the second rod body.

3. The telescopic rod structure according to claim 2, wherein a central axis of the first through hole overlaps with a central axis of the second through hole.

4. The telescopic rod structure according to claim 1, wherein a sum of the length $L_1$ of the second rod body and the length $L_2$ of the first through hole represents 5-15% of a length of the upper rod.

5. The telescopic rod structure according to claim 1, wherein a width of the hole stepped surface is $d_1$; $d_1$ satisfies $0<d_1<(D_2-D_1)<2$ mm; a width of the rod stepped surface is $d_2$; $d_2$ satisfies $(D_2-2d_1-D_1)/2<d_2<(D_2-D_1)/2$; and $D_2-2d_2<D_1+2d_1$; wherein $D_1$ represents the diameter of the first rod body and $D_2$ represents the diameter of the second through hole.

6. The telescopic rod structure according to claim 5, wherein a height of the rib is h, and $h=(D_2-D_1)/2$; a width of the rib is w, and $0<w<2\sqrt{(D_2/2)^2-(D_1/2)^2}$.

7. The telescopic rod structure according to claim 1, wherein the telescopic rod structure further comprises a telescopic rod locking device arranged between the upper rod and the lower rod; the telescopic rod locking device is connected with the upper rod and the lower rod; the telescopic rod locking device is sleeved on a position of the lower rod locating at an outer wall of the first through hole.

* * * * *